Patented Dec. 19, 1933

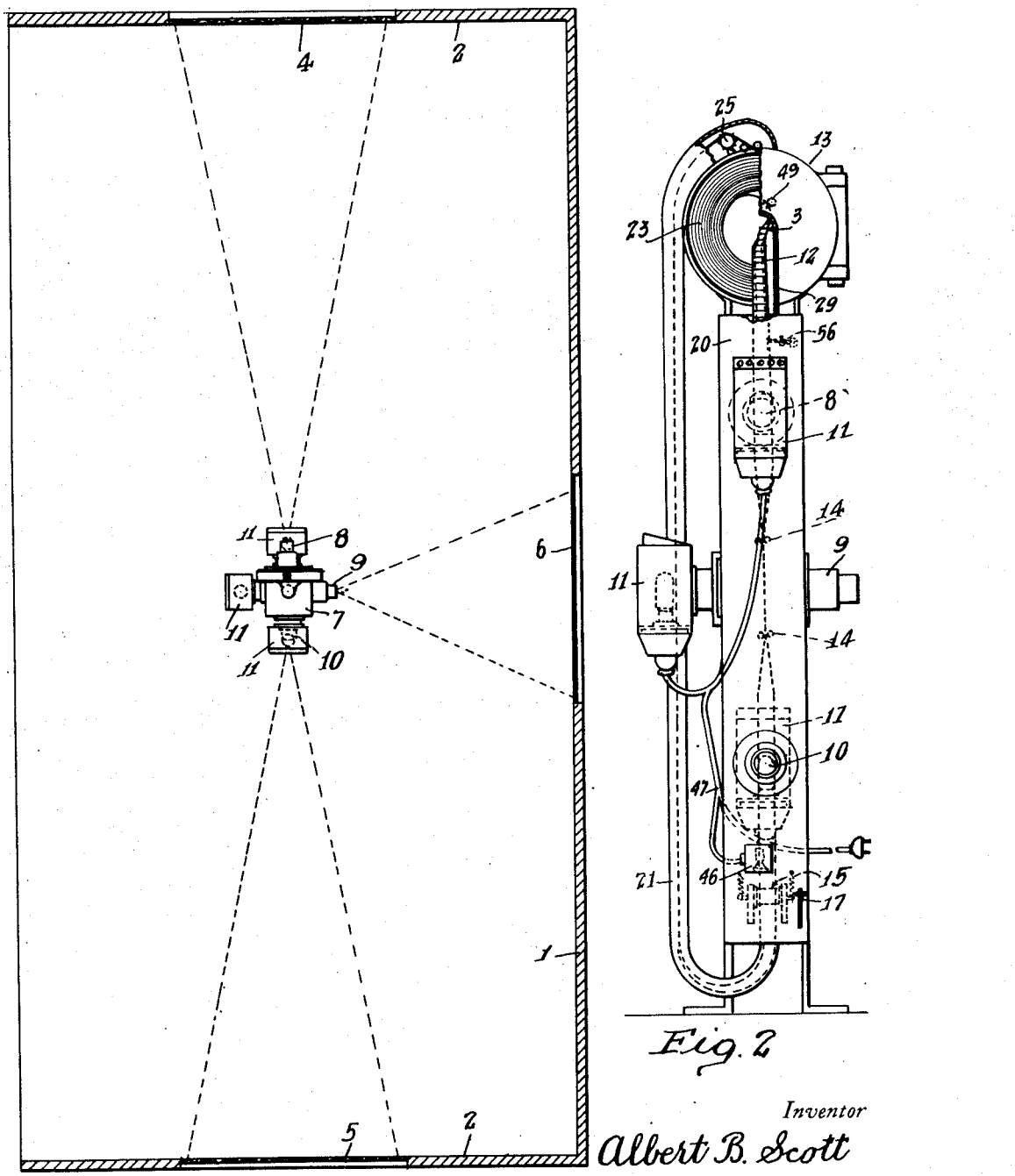

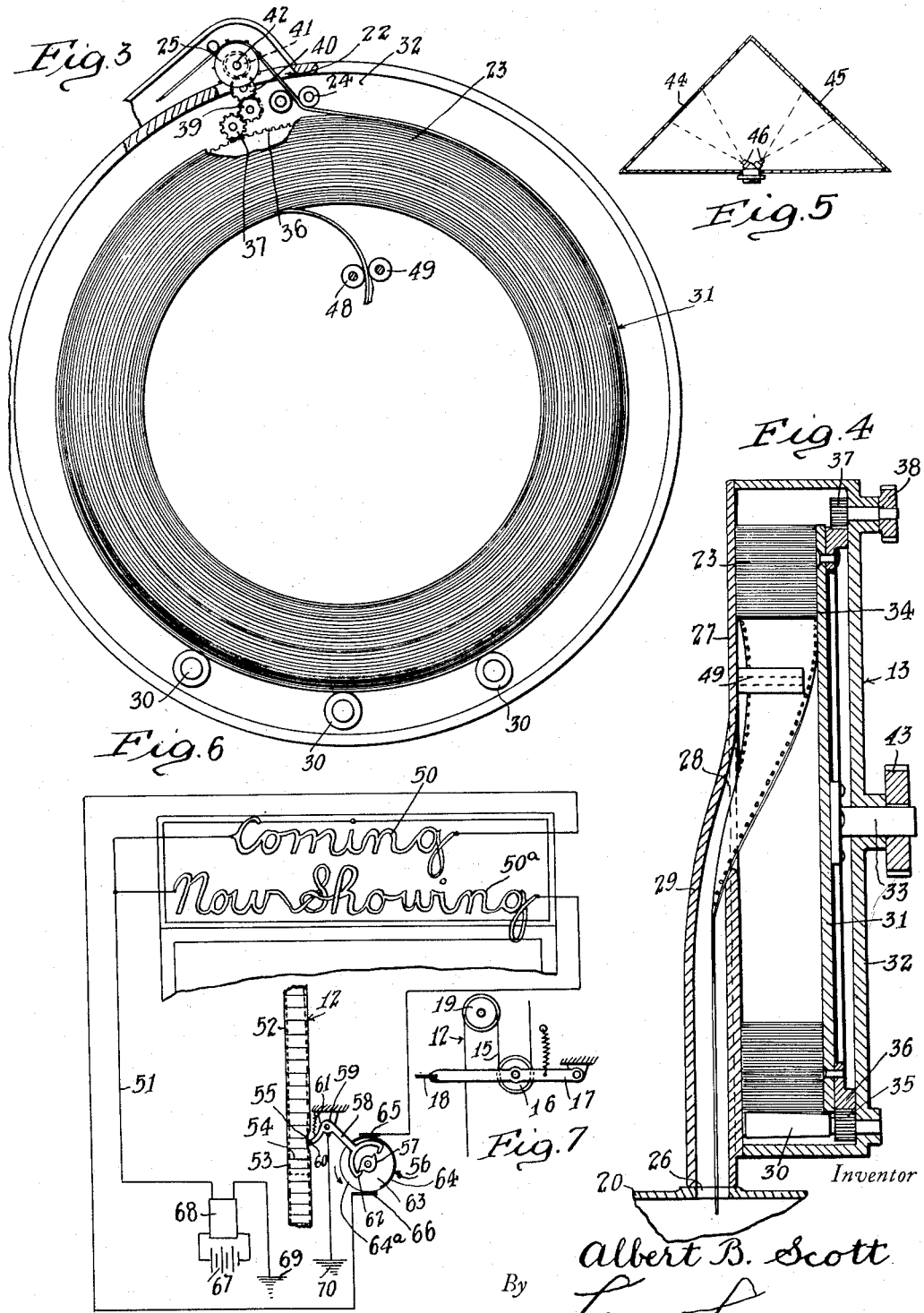

1,940,148

UNITED STATES PATENT OFFICE 1,940,148

PROJECTING APPARATUS

Albert B. Scott, Los Angeles, Calif., assignor of one-third to J. Rex Cole and one-third to Henry King, both of Los Angeles, Calif.

Application May 11, 1931. Serial No. 536,352

4 Claims. (Cl. 88—24)

My invention relates to projecting apparatus, and the invention is expected to be particularly useful when employed outside of playhouses for advertising attractions now showing, or coming, to the playhouse.

The general object of the invention is to provide projecting apparatus of simple construction, which can be set up in a convenient place, for example, in a marquee in front of the playhouse, and which will include screens mounted in the faces of the marquee on which pictures can be displayed showing some of the scenes of the play, or moving picture, then showing, or coming, to the playhouse; also to construct the apparatus in such a way as to enable the apparatus to operate continuously to project pictures on the screen corresponding to the coming attractions and alternating with pictures illustrating the attractions now showing.

One of the objects of the invention is to provide a construction whereby the same pictures can be projected on screens on different faces of the marquee simultaneously.

A further object of the invention is to provide a sign to associate with each screen on the marquee, which is automatically controlled to indicate whether the pictures then being projected onto the marquee are then showing in the playhouse, or coming attractions; in other words, to provide means for automatically controlling the sign from the film itself so that as soon as the pictures on the screen change from a coming attraction to a now showing attraction, the sign will immediately change to correspond therewith.

Further objects of the invention will appear hereinafter.

The invention consists of novel parts and combinations of parts to be described hereinafter, all of which contribute to produce an efficient projecting apparatus.

A preferred embodiment of the invention is described in the following specification, while the broad scope of the invention is pointed out in the appended claims.

In the drawings—

Figure 1 is a diagrammatic horizontal section through a marquee, and indicating the relation of the projecting mechanism to the screens on the different faces of the marquee;

Figure 2 is a side elevation and partial section of the projecting mechanism, and particularly illustrating the location and arrangement of the lenses for enabling a plurality of pictures to be projected simultaneously on different screens; this view also particularly illustrates my novel film holder which cooperates with the projecting apparatus to enable an endless film to be used in the same;

Figure 3 is a vertical section taken through the holder which is mounted above the projecting mechanism and which has special novel features of construction which enable it to be replenished with film while it is at the same time feeding off film to the projecting mechanism; a section is taken in the plane at right angles to the axis of rotation of the supply coil held within the holder;

Figure 4 is a vertical section taken about on the line 4, 4 of Figure 3, but omitting some of the parts shown in Figure 3, and particularly illustrating the inner details of the holder and the manner in which the film is guided from the supply coil through the outlet of the holder and into the projecting mechanism;

Figure 5 is a small diagrammatic view illustrating an adaption of the invention to a situation where it is desired merely to project pictures onto screens located at an angle to each other, for example, in a marquee where the marquee is of triangular form in plan;

Figure 6 is a diagrammatic view illustrating the lighting control apparatus for controlling the sign on the marquee to correspond with the pictures that are being shown on the marquee screen; and Figure 7 is a diagrammatic view illustrating a framing loop and parts for controlling the same to enable the pictures to be properly framed at the lenses.

Before proceeding to a more detailed description of the apparatus, it should be stated that according to the invention, two or more projecting lenses are mounted for projecting pictures from the film in different directions or corresponding screens. Two or more lenses may be employed, but in the following specification, the invention is described as embodying three lenses located in different planes or at different levels, each lens corresponding to a certain screen. The film instead of being of the usual character mounted in a supply reel which is run off through the apparatus until exhausted, consists of an endless film. This film is mounted in a supply holder of my invention which carries the body of the film in the form of a coil with an opening at its center from which the film is drawn off and fed down through the projecting mechanism.

As the film passes out of the other end of the projecting mechanism, it is guided up and back to the supply holder. The coil in the supply holder is rotated so that as the film is taken off from its center, it is replenished by portions of the film that are continuously coiled onto the outermost layer of the supply coil.

After the film is past the nearest lens to the supply holder, it is guided so as to form a twist so that the film is rotated by the twist through 180°. This enables the film to cooperate with the lowest lens to project a picture in the opposite direction from that in which the uppermost lens projects the picture. At an intermediate point between the upper and lower lens an intermediate lens is located opposite the middle point of the twist in the film and the projecting mechanism at this point operates to project the picture onto the screen on the front side of the marquee. The other two lenses project on the screens at the ends of the marquee.

Each screen on the marquee is preferably provided with a sign carrying a legend such as the word "Coming", and another legend carrying the words "Now showing". The film, as stated above, is an endless film and is composed of two divisions, one of which will carry certain interesting scenes from the coming attraction, and the other division carries certain scenes from a present attraction or an attraction which is "now showing." The apparatus, including an automatically controlled circuit, is preferably controlled by a notch in the edge of the film which automatically changes the lighted legend of the sign to correspond with the pictures being shown on the marquee screen.

The holder for the body of the film over the projecting apparatus is provided with a special means for effecting its rotation to assist in guiding off the film that passes from it down through the projecting mechanism, and also to effect the wrapping on the outside of the coil of the incoming portions of the film which have just posed through the projecting mechanism.

Referring more particularly to the parts, and especially to Figure 1, 1 indicates a marquee having two end walls 2 and a front face, or wall, 3. These faces of the marquee carry corresponding screens 4, 5, and 6, the screen 6 being exposed in the front of the marquee. Applying my invention to such a situation, I provide a projecting mechanism 7 located preferably at the geometrical center of the rectangle formed by the plane of the marquee. This mechanism includes an upper lens 8, an intermediate lens 9, and a lower lens 10 (see Figure 1). The two lenses 8 and 10 project in opposite directions, the lens 8 corresponding to the screen 4, while the lens 10 corresponds to the screen 5. Each lens has associated with it a light box 11 and the usual lenses and other appurtenances.

In the operation of the apparatus, (Figure 2) the endless film 12 is fed down from a holder at 3 in a position to present its flat face at right angles to the axis of the lens 8. As the film passes below the lens 8, it passes through two sets of guide rollers 14 that form a twist in the film so as to turn its plane through an angle of 180° before it passes into the guide of the lower projecting mechanism of the lens 10. In other words, at an intermediate point between the lenses 8 and 10, the "flat" of the film is disposed at right angles to the axis of the lens 9, thereby enabling this lens to project pictures onto screen 6. The focal length of the lens 9, would, of course, be adapted to the shorter distance of the screen 6.

The lenses 8, 9 and 10 are, of course, located a distance apart corresponding to the width of the frames, or pictures, of the film measured longitudinally with the film. In order to enable the pictures to be properly framed, I provide the film beyond the lowest lens 10 with a framing loop 15 in which floats a roller 16 carried on a lever 17 and this lever is provided with a handle 18 which can be depressed whenever desired to lower the "frames" at the three lenses. With this framing loop 15, a feed roller 19 is provided over which the film passes and from which the film passes downwardly out of the casing 20 of the projecting apparatus and down into a guide duct 21 which is completely enclosed and which guides the film back to a point near the upper side of the holder 13.

This holder is in the form of a drum (see Figure 4), the circumferential wall of which is provided with an inlet slot 22 through which the film is fed inwardly to wrap on the outermost layer of the coil 23 of the film which is held within the holder. At the point where the film passes into the inlet slot 22, I prefer to provide guide rollers 24, and adjacent this point, I provide a feed sprocket 25 for the film which is continuously driven so as to give a forward feed of the film at the same feet per second as the film passes through the projecting mechanism. The means for driving this roller will be described more in detail hereinafter.

The film holder or magazine 13 is mounted adjacent to an inlet slot 26 in the upper wall of the casing 20 of the projecting mechanism, and the side wall 27 of the holder adjacent to this slot is provided with an outlet opening 28 provided with a guide duct 29 which facilitates taking the film off from the innermost layer of the coil 23 and passing it down through the slot 26 (see Figure 4). In this way, while the film is being drawn off through this outlet 28, the coil 23 is being continuously supplied with additional wraps of film through the inlet opening 22.

It is advisable to provide means for rotating the coil 23 to facilitate the operation of drawing off the film at the center and supplying new film at the periphery of the coil. Any suitable means may be provided within the holder for rotating the coil.

However, I prefer to provide a plurality of rollers 30 on the under side of the film which are continuously driven, and in addition to this, I prefer to provide a driving plate 31 adjacent the rear side wall 32 of the holder. This plate is continuously rotated by a central shaft 33 to which it is attached, and its side toward the coil is preferably covered with a soft facing 34 of felt, or any other soft material. The mounting of the holder 13 should be such that the coil tends to gravitate up against the driving plate 31. In order to accomplish this, the holder may be mounted in a slightly tilted position with the outer end of the shaft 33 lower than its inner end. However, I prefer to mount the holder in an upright position and from the rollers 30 with a slight taper having their larger ends disposed away from the driving plate 31. The taper on these rollers, therefore, causes the coil to gravitate naturally toward the driving plate 31.

The rollers 30 are rotated continuously. For this purpose, I prefer to provide each roller with a pinion 35 that meshes with the teeth of the large gear wheel 36 attached to the outer face of the driving plate 31.

If desired, rollers similar to rollers 30 may be provided on the upper side of the holder for engaging the upper side of the coil.

The teeth of the gear 36 may be utilized to drive the feed sprocket 25. This may be accomplished by providing a pinion 37 at the upper side of the holder meshing with the gear wheel 36 and having a shaft that extends outwardly through the back wall 32 of the holder and carrying a pinion 38. This pinion on its outer side may mesh with an idler 39 which meshes with another idler 40 which idler 40 may mesh with a driven pinion 41 on the shaft 42 that carries the sprocket 25.

The shaft 33 may be provided with a driving pinion 43 which is driven at the proper speed. The speed of this shaft is preferably sufficient to give the innermost layer of the coil a periphery speed substantially equal to a feeding speed for the projecting apparatus, because this will enable the film to be constantly taken off at the same point on the periphery of the center of the coil. This point is preferably at a point vertically above the outlet opening 28. In this connection, it should be understood that the wraps of the film forming the coil would not be tight so as to permit considerable play as the film is fed into the holder and taken off from the same.

In the case where it is desired to project pictures onto only two screens, such as, screens 44 and 45 (see Figure 5), this would be accomplished by providing only two projecting lenses 46 mounted with their axes at different levels and the film would be twisted through a quarter turn in passing from the upper lens to the lower lens.

Just above the framing loop 15, the projecting apparatus may be provided with a sound box 46 to cooperate with a sound track along the edge of the film (see Figure 2). The light for this sound box can be connected up to the regular lighting cords 47 for the projecting apparatus and the photoelectric cell in the sound box can be connected up in the usual manner to a horn or speaker.

It is necessary that the film should be taken off from the inside of the coil 23 at a fixed point, and for this purpose, I provide two guide rollers 48 and 49 (see Figures 3 and 4), which project inwardly from the outer wall 27 and guide the film in a downward direction toward the outlet 28.

In adapting the invention to use for advertising plays given in a playhouse just above each screen, for example: above the screen 5 (see Figure 6), a sign is provided having two legends 50 and 50a, one of which may have the word "Coming", and the other legend having the words "Now showing". These signs "Coming" and "Now showing" are alternately dark and lighted, and are connected into an electric circuit 51, which is automatically controlled when the picture is being shown on the screen 5 change from one division of the film to the other. This may be accomplished in any suitable manner, but preferably through the agency of the film itself. In Figure 6, 52 and 53 indicate two divisions of a film having two connecting points or splices, such as, the splice 54. It should be understood that there are two such splices in the film and adjacent each splice, the film is provided with a small notch 55 in its edge. Cooperating with the edge of the film, I provide a switch device 56 controlled by the notch. This switch device preferably includes an escapement device 57 having a verge 58 formed on the arm of a bell crank lever 59, the other arm of which is provided with a small roller 60 running on the edge of the film and pressed lightly against it by a light coil spring 61 attached to the short arm 60 of the bell crank lever. The points of the verge 58 cooperate with two diametrically opposite teeth 62 on the escapement device and each time the verge is rocked by a passing into and out of the notch 55 the switch device 56 will be given half a revolution.

A switch shaft is constrained to rotate in the direction of the arrow by any suitable means, for example, by a wound-up weight (not illustrated), or by clock driving train (not illustrated). The switch includes a rotary switch member 63 which has an insulated side 64 and a metallic side 64a. The two sides of the switch member 63 cooperate with two fixed brushes 65 and 66. The brush 65 being connected with the sign 50a while the other brush is connected with the sign 50. The signs are supplied with electric current from any portion, such as, a battery 67 connected up with a transformer 68, one side of which is grounded at 69. The bell crank lever 59 is of metal and is connected with the ground as at 70.

With this organization of parts, it will be evident that the current will pass through the signs alternately, and while it is passing through one sign, the other sign will be dark.

In the operation of the complete apparatus, the film 12 is drawn off of the inside of the coil 23 passing between the guide rollers 48 and 49 and passes down the outlet 28 from which point it is guided into the guide of the lens 8. As it leaves the guide of the lens 8, the film forms a twist and passes between the guide rollers 14 on each side of the guide of the projector having the lens 9. Beyond this point, the film passes on completing the twist and passes through the guide of the lens 10. As the film is advanced by the regular feeding mechanism of the projecting mechanism (not illustrated), the pictures from the three lenses are projected on the three screens 4, 5, and 6. As the film is fed forward, the framing of the picture may be controlled whenever necessary by means of the lever 17 (see Figure 7).

When the film passes out of the guide of the lowest lens 10, it may pass a sound box 46 (see Figure 2) cooperating with a sound track on the film. Beyond this point, the film passes downwardly in a loop at the lower end of the conduit 21 and then passes upwardly in the conduit and thence over the sprocket 25 and between the guide rollers 24 and thence through the inlet 22 at the upper side of a holder 13 where the film wraps itself onto the periphery of the coil 23.

The film employed is preferably a continuous film, the film being a continuous film composed of two divisions 52 and 53. One of these divisions would carry pictures from a "Coming" attraction, and the other would carry pictures from a "Now showing" attraction. Adjacent the two connecting points of these two divisions of the film, the notch 55 is placed which automatically throws the switch device 56 so as to pass electric current to the sign "Coming" or the sign "Now showing", so that when pictures from a "coming" attraction are being exhibited on the screen, the word "Coming" will be lighted up and vice versa.

It is understood that the embodiment of the invention described herein is only one of the many embodiments this invention may take, and I do not wish to be limited in the practice of the invention, to the particular embodiment set forth.

What I claim is:—

1. In a projecting apparatus for advertising "Coming" attractions, and attractions "Now showing", in a playhouse, the combination of an endless film, said film comprising a division carrying pictures of a coming attraction and another division carrying pictures of a "now showing"

attraction, said divisions connected end to end to form said endless film, a screen, projecting mechanism for projecting pictures from the film onto the said screen, a sign associated with the screen bearing a legend indicating "Coming attractions" and bearing another legend indicating "Now showing" attractions, means for lighting the said legends alternately, and automatic means for effecting the lighting of the legend that corresponds to the pictures being thrown on said screen.

2. In a projecting apparatus for advertising "Coming" attractions, and attractions "Now showing", in a playhouse, the combination of an endless film, composed of a division carrying pictures of a coming attraction and another division carrying pictures of a "Now showing" attraction, a screen, projecting mechanism for projecting pictures from the film onto the said screen, a sign associated with the screen bearing a legend indicating "Coming" attractions, and bearing another legend indicating "Now showing" attractions, means for lighting the said legends alternately, an electric circuit for lighting either legend of the sign, a switch for controlling the circuit to light the legends alternately, means associated with the film for controlling the switch to throw the switch at times when the pictures on the screen change from one division to the other.

3. In a projecting apparatus for advertising "Coming" attractions, and attractions "Now showing", in a playhouse, the combination of an endless film, said film composed of a division carrying pictures of a "Coming" attraction and another division connected end to end with the first named division carrying pictures of a "Now showing" attraction, a screen, projecting mechanism for projecting pictures from the film onto the said screen, a sign associated with the screen bearing a legend indicating "Coming" attractions and bearing another legend indicating "Now showing" attractions, said film having a notch therein corresponding to the points on the film where the said two divisions connect with each other, switch mechanism controlled by the said notches, and an electric circuit controlled by the switch for lighting the said legends alternately.

4. In a projecting apparatus for advertising "Coming" attractions, and attractions "Now showing", in a playhouse, the combination of an endless film, composed of a division carrying pictures of a coming attraction and another division carrying pictures of a "Now showing" attraction, a screen, projecting mechanism for projecting pictures from the film onto the said screen, a sign associated with the screen bearing a legend indicating "Coming" attractions, and bearing another legend indicating "Now showing" attractions, and means for lighting the said legends alternately.

ALBERT B. SCOTT.